(12) United States Patent
Nemeth et al.

(10) Patent No.: US 10,552,943 B2
(45) Date of Patent: Feb. 4, 2020

(54) IMAGE SYNTHESIZER AND A METHOD FOR SYNTHESIZING AN IMAGE (71) Applicant: KNORR-BREMSE SYSTEME FUER NUTZFAHRZEUGE GMBH, Munich (DE)

(72) Inventors: Huba Nemeth, Budapest (HU); Marton Gyori, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 147 days.

(21) Appl. No.: 15/558,903

(22) PCT Filed: Mar. 22, 2016

(86) PCT No.: PCT/EP2016/056287
§ 371 (c)(1),
(2) Date: Sep. 15, 2017

(87) PCT Pub. No.: WO2016/156118
PCT Pub. Date: Oct. 6, 2016

(65) Prior Publication Data
US 2018/0089801 A1    Mar. 29, 2018

(30) Foreign Application Priority Data
Mar. 30, 2015 (EP) .................................. 15161697

(51) Int. Cl.
*B60R 1/00* (2006.01)
*G06T 3/40* (2006.01)
(52) U.S. Cl.
CPC .............. *G06T 3/4038* (2013.01); *B60R 1/00* (2013.01); *B60R 2300/105* (2013.01);
(Continued)

(58) Field of Classification Search
CPC ..... G06T 3/4038; G06T 3/4015; G06T 3/403; G06T 3/4046; G06T 3/40; G06T 5/01;
(Continued)

(56) References Cited

U.S. PATENT DOCUMENTS 6,278,463 B1* 8/2001 Chapman ............. H04N 5/2622
345/442
2004/0062439 A1* 4/2004 Cahill ....................... G06T 5/50
382/173
(Continued)

FOREIGN PATENT DOCUMENTS

| EP | 1775952 A2 | 4/2007 |
| EP | 2739050 A1 | 6/2014 |
| JP | 2002354468 A | 12/2002 |

OTHER PUBLICATIONS

International Search Report dated Jun. 22, 2016, of the corresponding International Application PCT/EP2016/056287 filed Mar. 22, 2016.

*Primary Examiner* — Dwayne D Bost
*Assistant Examiner* — Stephen M Brinich
(74) *Attorney, Agent, or Firm* — Norton Rose Fulbright US LLP; Gerard Messina (57) ABSTRACT

An image synthesizer for a driver assisting system includes a receiving module and a combining module. The driver assisting system includes a first camera configured to capture a first image from a first scene and a second camera configured to capture a second image from a second scene, wherein the first scene and the second scene partly overlap in an overlapping region. The receiving module configured to receive the first image from the first camera and the second image from the second camera. The combining module is configured to combine the first image and the second image in the overlapping region using a binary mask.

8 Claims, 8 Drawing Sheets

(52) U.S. Cl.
CPC ..... *B60R 2300/30* (2013.01); *B60R 2300/607* (2013.01); *G06T 2200/32* (2013.01)

(58) Field of Classification Search
CPC ........... B60R 1/00; B60R 1/002; B60R 1/007; B60R 2001/1253
USPC ......... 382/100, 103–107, 283–284, 294, 173
See application file for complete search history.

(56) References Cited

U.S. PATENT DOCUMENTS

| | | | |
|---|---|---|---|
| 2006/0192660 A1* | 8/2006 | Watanabe | B60R 1/00 340/435 |
| 2010/0014780 A1* | 1/2010 | Kalayeh | G06T 1/00 382/284 |
| 2011/0285848 A1 | 11/2011 | Han et al. | |
| 2014/0314325 A1* | 10/2014 | Muninder | G06T 3/4038 382/199 |
| 2018/0182143 A1* | 6/2018 | Veldandi | G06T 3/4038 |

* cited by examiner

IMAGE SYNTHESIZER AND A METHOD FOR SYNTHESIZING AN IMAGE

FIELD OF THE INVENTION

The present invention relates to image synthesizer and a method for synthesizing an image and, in particular, to an image synthesizing for a surround view system in a vehicle based on binary masking.

BACKGROUND INFORMATION

Surround view systems for passenger cars showing the vehicle from a bird's eye view are available from several manufacturers. A few solutions are also available for commercial vehicles, wherein multiple cameras are typically used to cover various sides of the vehicle. These multiple cameras may produce partially overlapping views that should be combined (synthesized) in the overlap areas to obtain a combined image. Otherwise, the two separate views of the same object may confuse the driver.

Although the creation of the bird's eye view of a vehicle is a common driver assistance application, in the area where the views of two cameras are to be combined together, the visibility of the objects is still not yet optimal. Due to the projection of the camera images to the ground, vertical objects are projected in the bird's eye view image in a way that they appear along a line extending away from the camera (i.e. radially from the camera ground point). Hence, at the location where the views of two cameras meet, the objects are projected into the areas, which are visible from the other camera. This may lead to a disappearance of the object in the bird's eye view.

Different methods are used by available systems for synthesizing the images into a single bird's eye view. A simple way is to separate the overlapping portions of the images with a straight line, and so to sidestep the problem, though at the cost of an abrupt change in the view as an object crosses the line. Another way is to allow an overlapping of the images, but to apply around the stitching line different kinds of blending procedures to obtain a transition from one camera view to the other.

Conventional blending procedures combine the images with a gradient transition from one image to the other by adding smoothly varying percentages of the different views in the overlapping area. This gradient blending area can be narrow (resulting in sharp transitions) or wide (resulting in slow transitions). For a narrow blending area a significant part of the object (e.g. an obstacle) may disappear, due to the projection of vertical images in the bird's eye view. On the other hand, in case of the wide blending, the obstacle may be seen twice (ghostlike).

Therefore, there is a demand for an image synthesizer, which overcomes the aforementioned problems and, in particular, generates a combined image that gives the driver confidences about the depicted scene.

SUMMARY OF THE INVENTION

The present invention solves the afore-mentioned problems by providing an image synthesizer according to the description herein, a driver assisting system according to the description herein, and a method of synthesizing an image according to the description herein. The further descriptions herein refer to specifically advantageous realizations of the subject matters of the main descriptions herein.

According to the present invention an image synthesizer for a driver assisting system comprises a receiving module and a combining module, wherein the driver assisting system includes a first camera configured to capture a first image from a first scene and a second camera configured to capture a second image from a second scene, the first scene and the second scene may at least partly overlap in an overlapping region. The receiving module is configured to receive the first image from the first camera and the second image from the second camera. The combining module is configured to combine the first image and the second image in the overlapping region using a binary mask.

The receiving module and combining module should be understood broadly to relate to any entity able to provide the respective functions. In particular, the modules may be implemented in a control unit (e.g. of the driving assisting system), e.g. as software modules to enable the control unit to provide the defined functions.

A binary mask may define a pattern (which can be depicted as a black/white picture) that identifies portions, which are to be masked. For example, if the binary mask is illustrated as a black/white picture and when applying the mask to the first image (e.g. "lying" over the first image), the white portions may be cut out or ignored from the image, whereas the black portions remain unchanged. In addition, when applying the same binary mask to the second image, the black portions may be cut out or ignored from the image, whereas the white portions remain unchanged. Since the same mask is used and since the pattern is complementary, both masked images can be combined with each other resulting in a combined image.

Therefore, in contrast to a gradient masking, the masking based on a binary mask does not add images portions (e.g. pixel values), but both images co-exist in adjacent image portions (or pixels) and, as will be explained in more detail later, this improves the visibility of the objects in the overlapping region. In particular, the ghosting is reduced and no abrupt changes occur in the combined image.

Therefore, in a further embodiment the binary mask comprises a pattern with a first plurality of first portions and a second plurality of second portions, wherein the combining module is configured to depict in the first portions respective portions of the first image and in the second portions respective portions of the second image. The resulting combined image represents an alternating view of the first image and the second image in the overlapping region along at least one direction. Each portion may comprise one or more pixels, and portions of the images may be understood as the respective pixel values. In an equivalent realization the receiving module is configured to carry out the described masking, i.e. to identify in the first image first portions, which are kept unchanged, and to replace the remaining portions with respective image data from the second image. The result would again be an image included alternating image data from the first and second image, but the process has been carried out by a different component (module).

In yet another embodiment the first scene may be adjacent to a first side of a vehicle and the second scene is adjacent to a second side of the vehicle, wherein the second side is perpendicular to the first side of the vehicle (or at any other angle) and the overlapping region may be a corner region of the vehicle. The combining module may be configured to combine the first image and the second image to a bird's eye view of the first scene and the second scene. Both cameras may also be arranged along one side of the vehicle (e.g. for a long vehicle). In this case the overlapping region may be the region that is equally spaced away from both cameras (i.e. around the middle point) or the overlapping region is the whole side of the vehicle.

Furthermore, the pattern defined by the binary mask may be non-homogeneous for implementing a smooth transition between the first and second image. Thus, in yet another embodiment, when following a path in the combined image from the first scene to the second scene, a density of first portions decreases in comparison to a density of second portions. For example, when going over from the first scene to the second scene, the decreased density may depend monotonically on an angle from 0 to 90° around the corner of the vehicle or on a distance from an edge of the overlapping region. In further embodiments, e.g. when the overlapping region is narrow and the difference between image data is minor, the binary mask may be homogeneous.

For some applications it may be of benefit to combine the binary mask with a mixed blending, i.e. to define portions in the pattern of the binary mask, wherein image data of the first and second image are added. The resulting mask is thus a combination of a binary mask and a blending mask. Hence, in yet another embodiment the pattern further comprises a third plurality of mixed portions and the combining module may be further configured to blend respective portions of the first image with respective portions of the second image and to depict the blended portions at respective mixed portions. For example, the combining module may add in the blended portions respective pixel values of the first image with pixel values of the second image in a predetermined ratio (e.g. 20:80 or 50:50 or 30:70 or any other ratios).

The combining module may further be configured to combine images from more than two cameras and to generate a surround view of the vehicle by combining images from each side of the vehicle. In addition, the combining module may generate a half-surround view by combining three images from at least three cameras that capture images from three sides of the vehicle.

The present invention relates also to a driver assisting system. The driver assisting system comprises an image synthesizer as described previously and, in addition, a first camera configured to capture a first image from a first scene and a second camera configured to capture a second image from a second scene, wherein the first scene and the second scene partly overlap over in an overlapping region.

The driver assisting system may also comprise a display and a control unit. The control unit may be configured to receive the combined image from the image synthesizer and to create a bird's eye view by combining the first image with the second image and the combined image. The display may be configured to display the bird's eye view to the driver. The driver assisting system may also comprise more than two cameras so that the control unit may generate a surround view or a half-surround view of the vehicle, by pairwise combining adjacent images as described in conjunction with the first and second image.

Furthermore, when all or some of the first portions and/or the second portions have a same size, this size or the number of the first and/or second portions may depend on a resolution of the display.

The present invention relates also to a vehicle with the driver assisting system, wherein the first camera and the second camera are arranged along one side of the vehicle or on two adjacent sides of the vehicle. The first and second cameras are positioned to capture images that at least partly overlap.

The present invention relates also to a method for synthesizing an image using a driver assisting system with a first camera configured to capture a first image from a first scene and a second camera configured to capture a second image from a second scene, the first scene and the second scene (partly) overlap in an overlapping region. The method comprises receiving the first image from the first camera and the second image from the second camera, and combining the first image and the second image in the overlapping region using a binary mask.

This method may also be implemented in software or a computer program product. Thus, the present invention relates also to a computer program product having a program code stored thereon for performing the above-mentioned method, when the computer program is executed on a computer or a processor. In addition, all functions described previously in conjunction with the image synthesizer or the driver assisting system may be realized as further method steps and be implemented in software or software modules.

Various embodiments of the present invention will be described in the following by way of examples only, and with respect to the accompanying drawings.

DETAILED DESCRIPTION

Figure 1:
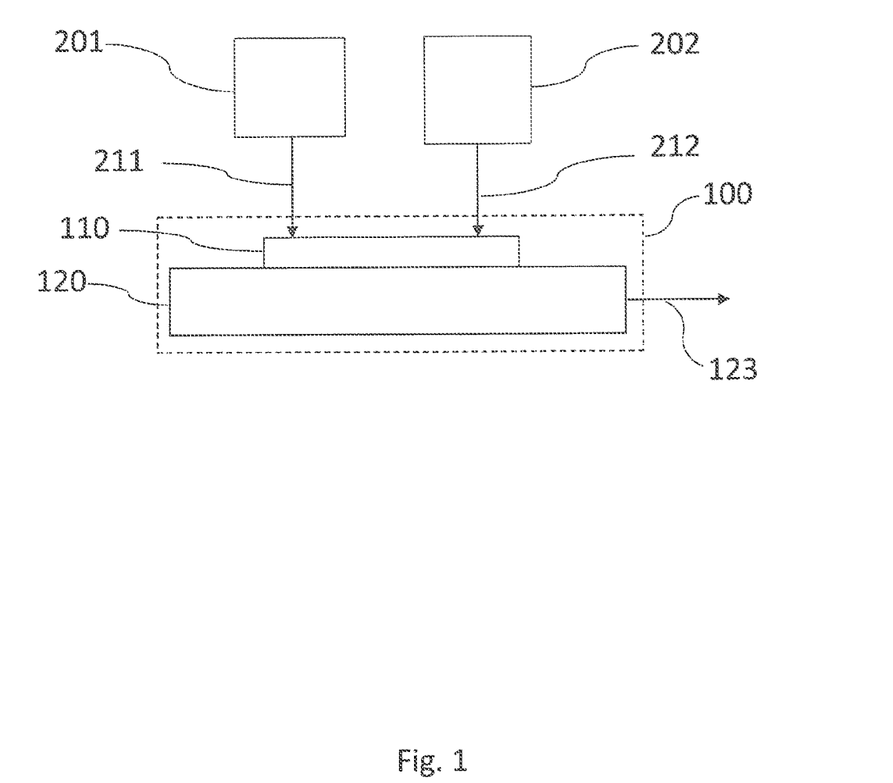
FIG. 1 depicts an image synthesizer according to an embodiment of the present invention.

FIG. 1 depicts an image synthesizer 100 for a driver assisting system and comprises a receiving module 110 and a combining module 120. The driver assisting system comprises a first camera 201 configured to capture a first image 211 from a first scene and a second camera 202 configured to capture a second image 212 from a second scene, wherein the first image 211 and the second image 212 overlap in an overlapping region. The first and second images 211, 212 may partly overlap (e.g. a corner region of a vehicle) or completely overlap. A complete overlap may occur if the first and second cameras 201, 202 take pictures from one side of a vehicle, but from different perspectives so that objects on the images are seen from different sides.

The receiving module 110 is configured to receive the first image 211 from the first camera 201 and the second image 212 from the second camera 202. The combining module 120 is configured to combine (synthesize) the first image 211 and the second image 212 in the overlapping region using a binary mask 130. The combining module 120 may further be adapted to output the combined (synthesized) image 123 to a display unit (not shown). Both the receiving module 110 and the combining module 120 may be implemented in a control unit of the driver assisting system. For example, the receiving module may be an input interface and the combining unit 120 may be implemented as a software module.

Figure 2:
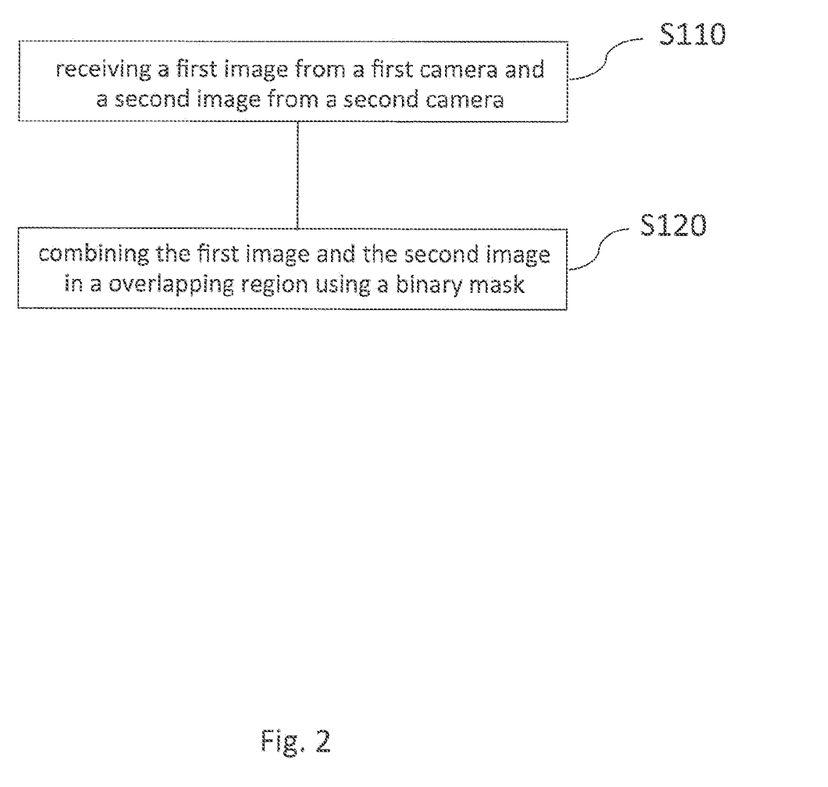
FIG. 2 illustrates a method according to an embodiment of the present invention.

FIG. 2 illustrates an embodiment for a method for synthesizing an image using the binary mask 130 and may carried out by the image synthesizer as shown in FIG. 1. Therefore, the method comprises the steps of receiving S110 the first image 211 from the first camera 201 and the second image 212 from the second camera 202, and combining S120 the first image and the second image 211, 212 in the overlapping region using the binary mask 130.

Figure 3:
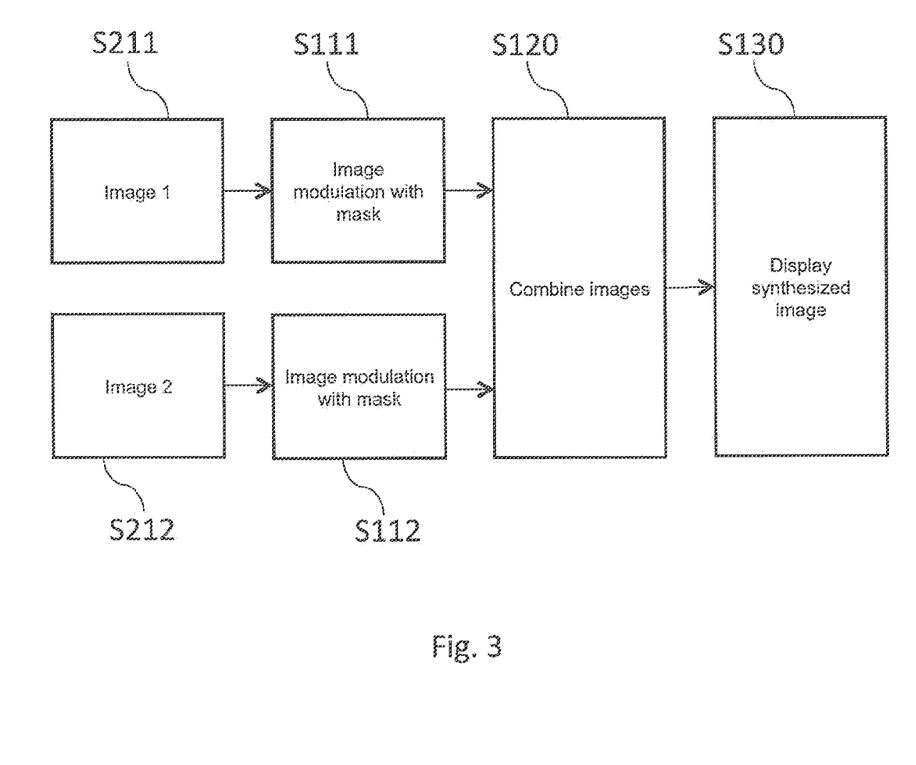
FIG. 3 depicts another embodiment implementing the procedure to combine two input images into a synthesized image.

FIG. 3 illustrates another embodiment of the inventive method with further optional steps. In a first step S211 the first image 211 (image 1) is captured by a first camera 201 and is received by the receiving module 110. In step S212 the second image 212 (image 2) is captured by a second camera 202 and is received by the receiving module 110.

The first image 211 is modulated with a first mask in step S111 and the second image 212 is modulated with a second mask in step S112. Both images may comprise a plurality of pixels and the image data are the pixel values (e.g. the brightness and/or color). The overlapping region depicts the same scene, although both cameras show possibly different perspectives. Also the overlapping region can be characterized by a plurality of pixels. When applying a binary mask to this overlapping region, the pixels of the overlapping region are selected to depict either the first image 211 or the second image 212, but not both or a mixture of both. Therefore, the first and second mask may be complementary to each other, i.e. the masking (or modulating) of the first image 211 selects a first set of pixels from the plurality of pixels from the first image 211 and the masking of the second image 212 selects a second set of pixels (different from the first set) from the plurality of pixels from the second image 212.

Subsequently, in step S120, the modulated first image and the modulated second image are combined using the binary mask and finally, in step S130, the synthesized image 123 is displayed on a display, e.g., of a driver assisting system.

Figure 4:
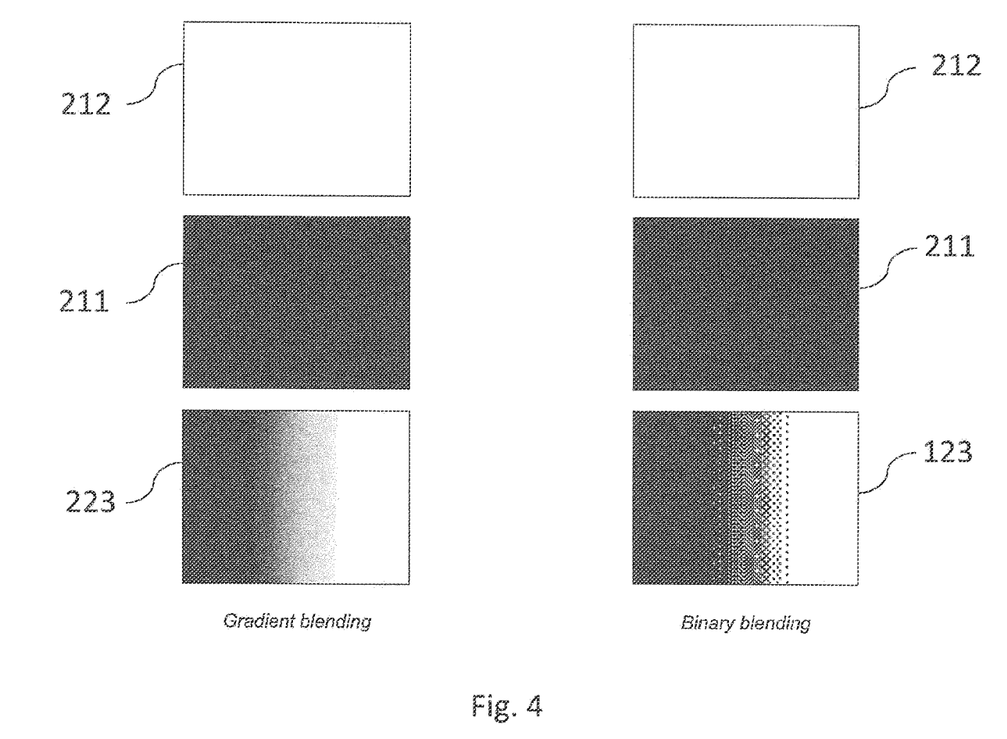
FIG. 4 compares the conventional gradient blending with the binary blending according to embodiments.

FIG. 4 illustrates further the combination of two images using the binary mask in comparison to a combination of the two images using the conventional gradient blending (which is shown on the left-hand side of FIG. 4). In this conventional procedure a first image 211 and a second image 212 are combined such that on the left-hand side of the combined image 223 the first image 211 is depicted which goes gradually over to the second image 212 on the right-hand side of the combined image 223. In this example, the first image 211 is simply depicted as a black image whereas the second image 212 is depicted as a white image. It is understood that the black/white images 211, 212 are only considered for the purpose of simplification and not as limitation—in other embodiment the first and second image 211, 212 may be any colored or grey-scaled image.

On the right-hand side of FIG. 4 the binary blending is illustrated. Again, a first image 211 being a black image and a second image 212 being a white image are combined using a binary mask to generate a synthesized image 123. Again, the synthesized image 123 shows on the left-hand side the first image 211 that goes stepwise over to the second image 212 on the right-hand side of the synthesized image 123.

As for real situations, the (black) first image 211 and the (white) second image 212 can be replaced by any images such that in the binary blending any black pixel (point) in the combined image 123 should be replaced by the corresponding image data of the first image, and any white pixel (point) should be replaced by the corresponding image data of the second image.

The conventional gradient blending (on the left hand side) is widely used in conventional systems where pixel values are added. The binary blending mask on the right hand side produces an alternating view of the two images. It provides the advantage to support the ability of the human eye and brain to combine the camera views and filter the less relevant and more relevant information in the blending area.

Figure 5:
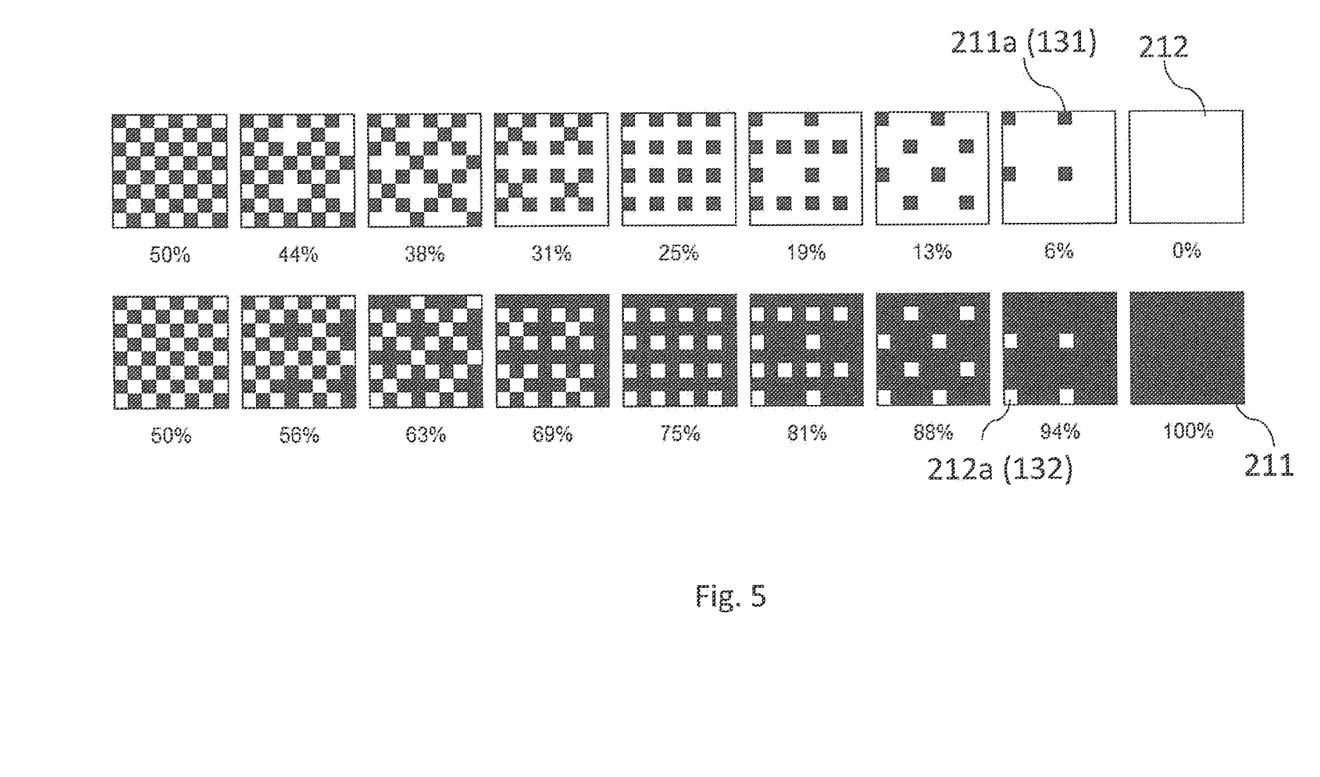
FIG. 5 depicts different pixel combinations used for the binary masks to realize a smooth transition from one image to the other.

FIG. 5 illustrates more details for the binary mask 130 when going from one image (e.g. the black image) to another image (e.g. the white image). Since the number of pixels cannot be varied continuously, it is not possible to achieve a continuous modification when going from the first image to the second image and a binary mask is used. Instead, the adaptations go stepwise.

In detail, FIG. 5 depicts different pixel combinations to realize a transition from one image to the other as smooth as possible. One square in the boxes may correspond to one pixel so that every square contains 8×8=64 pixels. The percentage is given by the number of black pixels divided by the number of pixels in the box (i.e. 64). E.g., the box belonging to 31% comprises 20 black pixels of total 64 pixels. In this example, the 8×8 pixel portion contains 4 identical 4×4 patterns making the transition better visible. It should be understood that the 8×8 pixel combination depicted in this embodiment is merely an example, in other embodiments other numbers of pixels are also possible.

Therefore, with the binary mask 130 the interpolation between the first image 211 and the second image 212 can be obtained as follows. In a first step, when starting from the second image 212, each 4×4 pattern contains one black pixel 211a implying that only 6% of the total image is covered by the first image 211, whereas the remaining part is covered by the second image 212. In a subsequent step, 13% of the total image is covered by the first image 211 (i.e. two black pixels in each 4×4 pattern), whereas the remaining pixels are covered by the second image 212. In each following box, one additional black pixel 211a is added in each 4×4 pattern until only one white pixel 212a remains in each 4×4 pattern and at the end 100% of the pixels depict the first image 211. Each black portion 131 (pixel) in this mask 130 depicts thus first image data, whereas each white portion 132 (pixel) in this mask 130 depicts second image data. The increasing proportion of the black pixels implements thus an interpolation from the second image 212 to the first image 211 (again when the black/white portions are replaced by the respective image data).

Hence, the resulting image 123 as depicted in the bottom of FIG. 4 can be achieved by lining up the sequence as shown in FIG. 5 from the left-hand side to the right-hand side, whereas the black parts are the respective pixels associated to the first camera 201 and the white parts are the respective pixels associated to the second camera 202. Again, the black/white pixels are replaced by the actual image data of the first/second image. These 8×8 pixel lines can also be reiterated over the whole height of the image 140.

Figure 6:
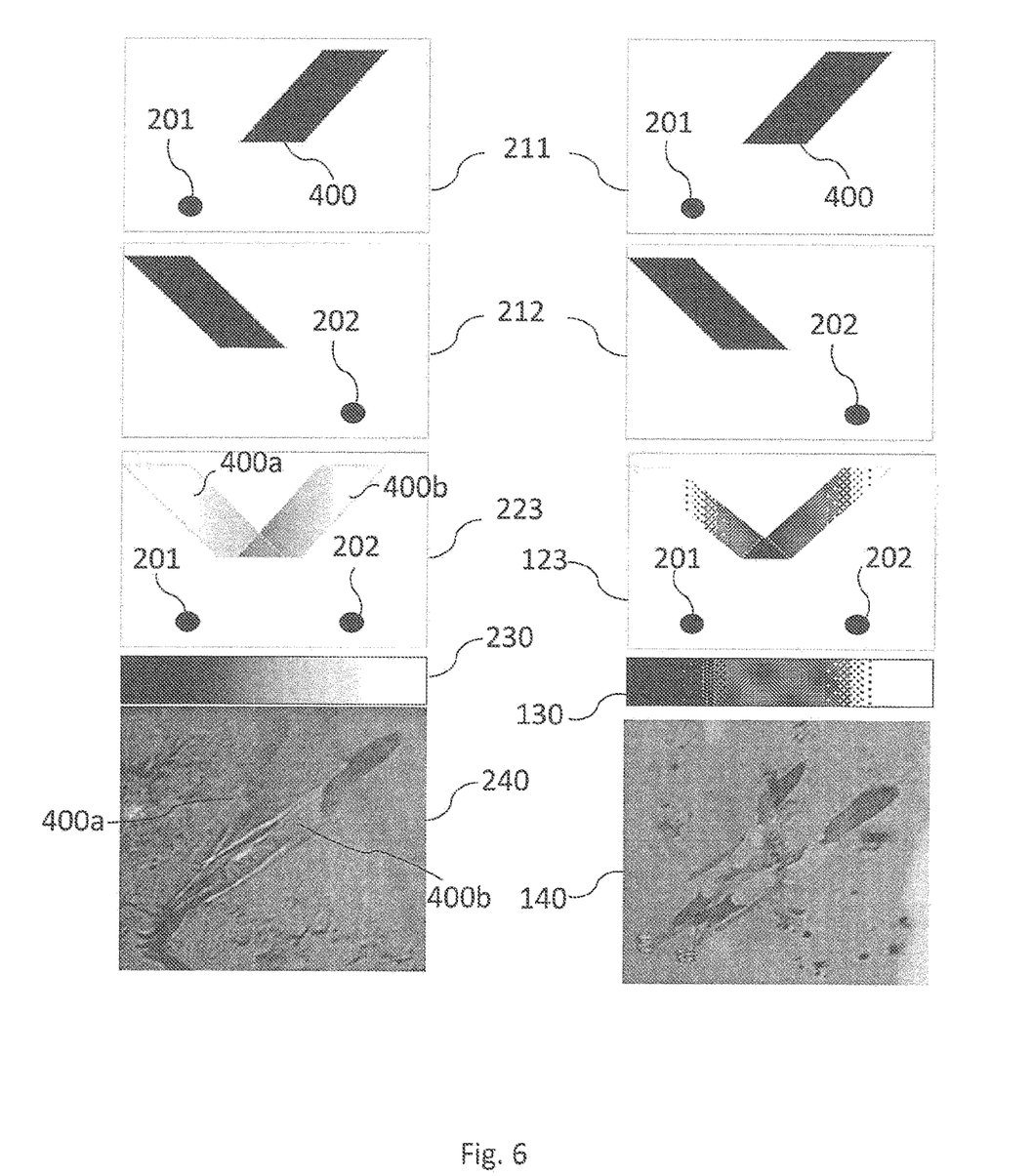
FIG. 6 shows how the synthesized image is created from two separate camera views.

FIG. 6 shows how the synthesized image is created from two separate camera views, which completely overlap, but show different perspectives. The synthesized image always shows partly the first camera view 211 and partly the second camera view 212.

Depending on how the two images 211, 212 are combined the object may be seen from one or the other camera perspective or partly from both. In particular, FIG. 6 depicts an example, wherein the first camera 201 and the second camera 202 capture a person as an object 400 from different perspectives.

On the left-hand side a gradient blending of the two images 211, 212 is shown. The first image 211 captured by a first camera 210 is combined with the second image 212 captured by a second camera 202. The resulting synthesized image 223 shows two objects 400a, 400b, which extend in different directions due to the different perspectives of the first and second camera 201, 202.

To combine these two images, the mask 230 is applied, which defines a smooth transition between the images captured by the cameras. The transition from the first image 211 to the second image 212 is achieved by adding pixel values with an increased ratio of the first image 211 (black part in the mask 230) in comparison to the second image 212 (white part in the mask 230). Therefore, in the synthesized image 223 on the right-hand side the second image 212 is shown (which is simply white at this location) and which goes over on the left-hand side of the synthesized image 223 to the first image 211, which again is white at that location. Only in the middle region of both images, the synthesized image 223 shows a gray colored object, which is a combination of the first image 211 and the second image 212 at this middle point.

When considering not black/white images, but real colored or grey-scaled images, the conventional gradient blending produces the two faded (ghostlike) objects 400a, 400b as it is apparent from the picture 240 at the bottom of FIG. 6 on the left-hand side, wherein the object captured by the first camera 201 and the second camera 202 is a person. Again, the fact that the object 400 appears with an angle in the first image 211 and the second image 212 is related to the different capture angles (perspectives) for the first camera 201 and the second camera 202 when capturing the object 400.

On the right-hand side of FIG. 6, the first image 211 and the second image 212 depict again an object 400 captured with the first camera 201 and the second camera 202 from different sides. However, when combining the first image 211 and the second image 212, a binary mask 130 is applied to generate the synthesized image 123. This binary mask 130 implements a change from the second image 212 on the right-hand side to the first image 211 depicted on the left-hand side.

In contrast to the conventional gradient blending, the usage of the binary mask 130 results in discrete changes when going from the right-hand side to the left-hand side as it was described in with FIG. 5. Therefore, when using a binary mask, image data are not added up (for example for a given pixel), but each pixel of the combined image 123 is either related to the first image or the second image. This can be achieved by "lying" the binary mask 130 on the image 123 and to replace black pixels in the combined image by pixel vales of the first image 211 and to replace white pixels by corresponding pixel values of the second image 212.

In comparison to picture 240 obtained by applying the conventional gradient blending, the picture 140 obtained in accordance to the present invention depicts the object more clearly and more sharply and avoids the ghostlike appearance as shown in the picture 240. Therefore, the binary blending improves the visibility of the object in the resulting image.

Figure 7A:
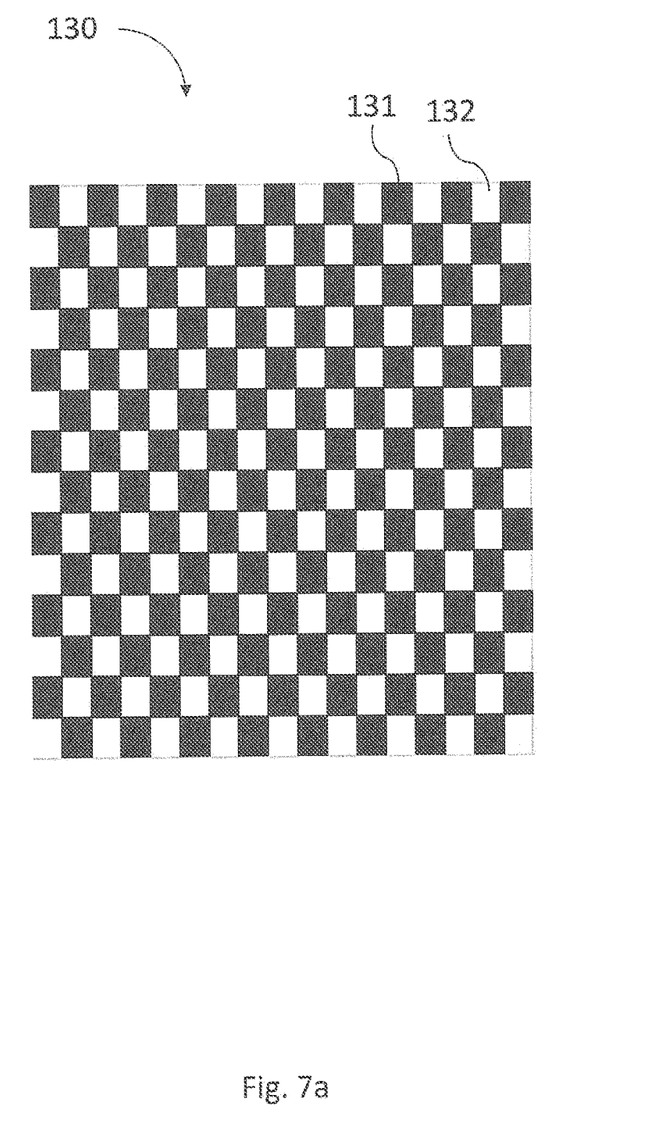
FIGS. 7a and 7b show a binary blending mask and a mixed binary blending mask.
Figure 7B:
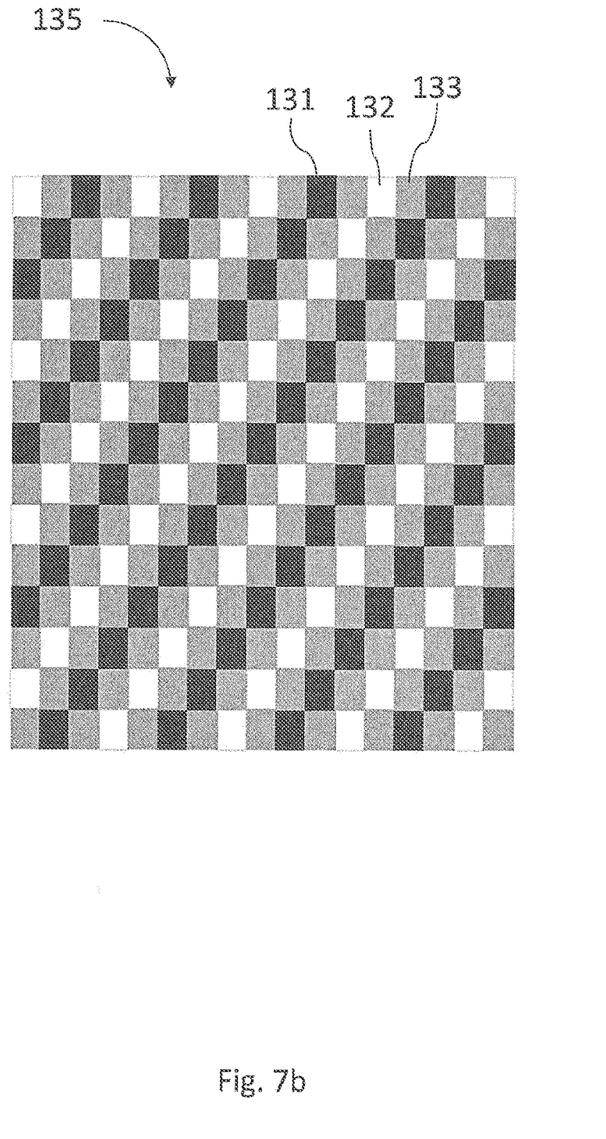

FIGS. 7a and 7b show examples for binary masks.

In FIG. 7a the first image 211 and the second image 212 will be equally distributed by the mask 130 (e.g. the 50% view in FIG. 5). Again, the black portions 131 will depict the first image 211, whereas the white portions 132 may depict the second image 212. Therefore, there is no mixing of the first image 211 and the second image 212, but each pixel or each portion of pixels will depict either the first image 211 or the second image 212 but no both (no mixing is performed).

FIG. 7b depicts another embodiment for a binary mask 135, which combines a binary mask with a gray scale mask. Again, in the black portions 131 the first image 211 may be depicted and in the white portions 132 the second image 212 may be depicted. The gray-scaled portions 133 will depict a combination of the first image and the second image 211, 212 (i.e. the image data are added in these pixels), i.e. the grey pixels are pixels of the synthesized image that will be created from the combination of two images according to a predetermined grey level. For example, if the grey is 50%, then the pixel of the synthesized image will be the average of the pixels in the two images.

For example, each black, white or grey squares 131, 132, 133 shown in FIGS. 7a,b may represent one of more pixels of the respective first and/or second image 211, 212. For example, each square may correspond to N×M pixels for any integer N, M=1, 2, 3, 4, 5 . . . . These numbers may be selected based on the resolution of the display, which is used to show the synthesized image to the driver.

It should also be understood, the black and white color are only used to distinguish between the two binary options, i.e. whether image data of the first image or image data of the second image will be inserted or depicted at these portions. There is no correlation between the black color and/or white color used in FIG. 7 with the actual color of the corresponding image.

The particular ratio used in the gray-scale squares can be selected freely. In addition, further gray scales can be implemented. However, even if multiple gray-scaled portions are implemented, there are still pixels that depict only the first image 211 and further pixels that depict only the second image 212. This provides the advantage that a user can more easily recognize an object in the synthesized image, thereby improving the visibility of objects (as, for example, persons being around the vehicle).

Conventional surround view systems for commercial vehicles are either not using any blending or they apply a gradient blending to synthesize the camera images. This method had the disadvantage that lead to improper visibility of the objects around the vehicle. The current invention improves the visibility of the object in the areas where the images from two cameras are synthesized. In particular, the non-additive combining of pixels in image synthesizing allows maximum visibility of the objects even in the blending area.

In comparison to conventional blending procedures, the advantageous aspects of the various embodiments can be summarized as follows:

A further advantageous embodiments of the present invention relate to an image synthesizing method for driver assistance systems that comprises: two or more cameras; an image synthesizer characterized in that the views of the scene from the cameras are combined into one view using a binary mask.

The image synthesizing method may further be characterized in that the mask has a pattern that results in an alternating view of the multiple camera views in the area where the multiple images are combined.

The image synthesizing method may further be characterized in that the pixels of the images can be combined as well.

The present invention allows seeing pixels from a camera image even in the area of the other camera image in the bird's eye view. Both views are present within each other.

This way, the object stays visible even though it is projected into the area of the other camera view. This solution uses the characteristics of the human eye and brain, which filters out the relevant information from the view that is seen. This method allows the driver to easily recognize objects in the stitching area as well.

All methods described herein may also be a computer-implemented method. A person of skill in the art would readily recognize that steps of various above-described methods might be performed by programmed computers. Embodiments are also intended to cover program storage devices, e.g., digital data storage media, which are machine or computer readable and encode machine-executable or computer-executable programs of instructions, wherein the instructions perform some or all of the steps of the above-described methods, when executed on the a computer or processor.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

The list of reference signs is as follows:
100 image synthesizer
110 receiving module
120 combining module
123 combined image
130 binary mask
131 first portions/pixels
132 second portions/pixels
133 mixed portions/pixels
135 mixed binary mask
140 combined picture with binary masking
201 first camera
202 second camera
211 first image
211a a pixel of the first image
212 second image
212a a pixel of the second image
223 conventionally combined image
230 gradient masking
240 conventionally combined picture
400 object

The invention claimed is:

1. An image synthesizer for a driver assisting system, comprising:
a receiving module to receive a first image from a first camera and a second image from a second camera, the driver assisting system including the first camera to capture the first image from a first scene and the second camera to capture the second image from a second scene, wherein the first scene and the second scene partly overlap in an overlapping region; and
a combining module to combine the first image and the second image in the overlapping region using a binary mask;
wherein the binary mask includes a pattern with a first plurality of first portions and a second plurality of second portions, wherein the combining module is configured to depict in the first portions respective portions of the first image and in the second portions respective portions of the second image to obtain a combined image representing alternating views of the first image and the second image in the overlapping region along at least one direction, and
wherein, when following a path in the combined image from the first scene to the second scene, a density of first portions decreases in comparison to a density of second portions.

2. The image synthesizer of claim 1, wherein, when going from the first scene to the second scene, the decreased density depends monotonically on an angle from 0 to 90° around a corner of the vehicle or a distance from an edge of the overlapping region.

3. An image synthesizer for a driver assisting system, comprising:
a receiving module to receive a first image from a first camera and a second image from a second camera, the driver assisting system including the first camera to capture the first image from a first scene and the second camera to capture the second image from a second scene, wherein the first scene and the second scene partly overlap in an overlapping region; and
a combining module to combine the first image and the second image in the overlapping region using a binary mask;
wherein the binary mask includes a pattern with a first plurality of first portions and a second plurality of second portions, wherein the combining module is configured to depict in the first portions respective portions of the first image and in the second portions respective portions of the second image to obtain a combined image representing alternating views of the first image and the second image in the overlapping region along at least one direction, and
wherein the first scene is adjacent to a first side of a vehicle and the second scene is adjacent to a second side of the vehicle, the first side and the second side being perpendicular to each other or being the same side of the vehicle, and wherein the combining module is configured to combine the first image and the second image so as to provide a bird's eye view of the first scene and the second scene.

4. An image synthesizer for a driver assisting system, comprising:
a receiving module to receive a first image from a first camera and a second image from a second camera, the driver assisting system including the first camera to capture the first image from a first scene and the second camera to capture the second image from a second scene, wherein the first scene and the second scene partly overlap in an overlapping region; and
a combining module to combine the first image and the second image in the overlapping region using a binary mask;
wherein the binary mask includes a pattern with a first plurality of first portions and a second plurality of second portions, wherein the combining module is configured to depict in the first portions respective portions of the first image and in the second portions respective portions of the second image to obtain a combined image representing alternating views of the first image and the second image in the overlapping region along at least one direction, and
wherein the pattern includes a third plurality of mixed portions and the combining module is further configured to blend respective portions of the first image with respective portions of the second image and to depict resulting blended portions at respective mixed portions.

5. The image synthesizer of claim 4, wherein the combining module is configured to add in the blended portions respective pixel values of the first image and pixel values of the second image in a predetermined ratio.

6. A driver assisting system, comprising:
a first camera to capture a first image from a first scene;
a second camera to capture a second image from a second scene, wherein the first scene and the second scene partly overlap over in an overlapping region;
an image synthesizer, including a receiving module to receive the first image from the first camera and the second image from the second camera, and a combining module to combine the first image and the second image in the overlapping region using a binary mask, so as to provide a combined image; and
a display and a control unit configured to receive the combined image from the image synthesizer and to create a bird's eye view by combining the first image with the second image and the combined image, wherein the display is configured to display the bird's eye view;
wherein the binary mask includes a pattern with a first plurality of first portions and a second plurality of second portions, wherein the combining module is configured to depict in the first portions respective portions of the first image and in the second portions respective portions of the second image to obtain a combined image representing alternating views of the first image and the second image in the overlapping region along at least one direction, wherein at least part of the first portions and/or the second portions in the binary mask include a size, and wherein the size or a number of the first portions and/or second portions depends on a resolution of the display, and
wherein the first camera and the second camera are arranged along one side of the vehicle or on two adjacent sides of the vehicle.

7. A method for synthesizing an image using a driver assisting system, the method comprising:
receiving a first image from a first camera and a second image from a second camera, the driver assisting system including the first camera to capture the first image from a first scene and the second camera to capture the second image from a second scene, wherein the first scene and the second scene partly overlap in an overlapping region; and
combining the first image and the second image in the overlapping region using a binary mask;
wherein the binary mask includes a pattern with a first plurality of first portions and a second plurality of second portions, wherein the combining module is configured to depict in the first portions respective portions of the first image and in the second portions respective portions of the second image to obtain a combined image representing alternating views of the first image and the second image in the overlapping region along at least one direction, and
wherein, when following a path in the combined image from the first scene to the second scene, a density of first portions decreases in comparison to a density of second portions.

8. A non-transitory computer readable medium having a computer program, which is executable by a processor, comprising:
a program code arrangement having program code for synthesizing an image using a driver assisting system, by performing the following:
receiving a first image from a first camera and a second image from a second camera, the driver assisting system including the first camera to capture the first image from a first scene and the second camera to capture the second image from a second scene, wherein the first scene and the second scene partly overlap in an overlapping region; and
combining the first image and the second image in the overlapping region using a binary mask;
wherein the binary mask includes a pattern with a first plurality of first portions and a second plurality of second portions, wherein the combining module is configured to depict in the first portions respective portions of the first image and in the second portions respective portions of the second image to obtain a combined image representing alternating views of the first image and the second image in the overlapping region along at least one direction, and
wherein, when following a path in the combined image from the first scene to the second scene, a density of first portions decreases in comparison to a density of second portions.

* * * * *